US009137045B2

(12) United States Patent
Chen et al.

(10) Patent No.: US 9,137,045 B2
(45) Date of Patent: Sep. 15, 2015

(54) ETHERNET MULTICAST METHOD AND DEVICE (71) Applicant: Huawei Technologies Co., Ltd., Shenzhen, Guangdong (CN)

(72) Inventors: Xueliang Chen, Shenzhen (CN); Guangyu Shi, Shenzhen (CN); Liufei Wen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 13/676,924

(22) Filed: Nov. 14, 2012

(65) Prior Publication Data

US 2013/0070767 A1    Mar. 21, 2013

Related U.S. Application Data (63) Continuation of application No. PCT/CN2011/073719, filed on May 6, 2011.

(30) Foreign Application Priority Data

Jul. 14, 2010    (CN) .......................... 2010 1 0226149

(51) Int. Cl.
*H04L 12/28* (2006.01)
*H04L 12/54* (2013.01)
(Continued)

(52) U.S. Cl.
CPC .............. *H04L 12/56* (2013.01); *H04L 12/185* (2013.01); *H04L 12/40013* (2013.01); *H04L 12/413* (2013.01); *H04L 45/16* (2013.01)

(58) Field of Classification Search
USPC .................................................. 370/390, 254
See application file for complete search history.

(56) References Cited

U.S. PATENT DOCUMENTS 6,032,194 A * 2/2000 Gai et al. ....................... 709/239
6,795,403 B1 * 9/2004 Gundavelli ................... 370/256
(Continued)

FOREIGN PATENT DOCUMENTS

CN    1716955 A    1/2006
CN    1324863 C    7/2007
(Continued)

OTHER PUBLICATIONS (C. Kim, M. Caesar, and J. Rexford. Floodless in SEATTLE: A Scalable Ethernet Architecture for Large Enterprises. In SIGCOMM '08).*

(Continued)

*Primary Examiner* — Curtis A Alia
*Assistant Examiner* — Emmanuel Maglo
(74) *Attorney, Agent, or Firm* — Leydig, Voit & Mayer, Ltd.

(57) ABSTRACT

An Ethernet multicast method and device are provided, which relate to the communications technology field, and improve the capability of distributing multicast data in the Ethernet. The method includes: receiving a request from a host/multicast source, wherein the request carries a multicast Media Access Control (MAC) address of a destination multicast group; selecting, according to the request, a switch satisfying a particular optimization condition as a multicast root node corresponding to the multicast MAC address of the destination multicast group when it is determined that the multicast MAC address of the destination multicast group does not have the corresponding multicast root node; transmitting an identification of the multicast root node to the host/multicast source. The embodiments of the present invention are mainly applied to the process of the multicast data distribution in the Ethernet.

13 Claims, 5 Drawing Sheets

(51) Int. Cl.
*H04L 12/413* (2006.01)
*H04L 12/40* (2006.01)
*H04L 12/18* (2006.01)
*H04L 12/761* (2013.01)

(56) References Cited

U.S. PATENT DOCUMENTS

| | | | |
|---|---|---|---|
| 7,450,526 B2 | 11/2008 | Yang | |
| 7,580,368 B2 * | 8/2009 | Yoneda et al. | 370/254 |
| 7,643,506 B2 * | 1/2010 | Cantenot et al. | 370/432 |
| 7,957,287 B2 * | 6/2011 | Venkatachalam | 370/232 |
| 8,144,708 B1 * | 3/2012 | Ahmed et al. | 370/390 |
| 8,848,509 B2 * | 9/2014 | Allan | 370/216 |
| 8,982,761 B2 * | 3/2015 | Zou et al. | 370/312 |
| 2010/0067910 A1 | 3/2010 | Mizutani et al. | |
| 2010/0284309 A1 * | 11/2010 | Allan et al. | 370/256 |
| 2010/0306408 A1 * | 12/2010 | Greenberg et al. | 709/238 |
| 2011/0064077 A1 | 3/2011 | Wen | |

FOREIGN PATENT DOCUMENTS

| | | | |
|---|---|---|---|
| CN | 101299671 A | | 11/2008 |
| CN | 100512286 C | | 7/2009 |
| CN | 101771551 A | | 7/2010 |
| WO | WO 2006099782 A1 * | | 9/2006 |
| WO | WO 2008131634 A1 * | | 11/2008 |

OTHER PUBLICATIONS

Search Report in corresponding Chinese Patent Application No. 201010226149.3 (Aug. 29, 2012).

Kim et al., "Floodless in SEATTLE; A Scalable Ethernet Architecture for Large Enterprises," Proceedings of the ACM SIGCOMM 2008 Conference on Data Communication, 2008, ACM, New York, New York.

International Search Report in corresponding International Patent Application No. PCT/CN2011/073719 (Aug. 18, 2011).

Mysore et al., "PortLand: A Scalable Fault-Tolerant Layer 2 Data Center Network Fabric," Proceedings of the ACM SIGCOMM 2009 Conference on Data Communication, 2009, ACM, New York, New York.

Extended European Search Report in corresponding European Patent Application No. 11806235.5 (Jan. 14, 2013).

Written Opinion of the International Searching Authority in corresponding PCT Patent Application No. PCT/CN2011/073719 (Aug. 18, 2011).

Lee et al., "RP Reselection Scheme for Real-Time Applications in Delay-Constrained Multicast Networks," 2002, IEEE, New York, New York.

Elmeleegy et al., "EtherProxy: Scaling Ethernet by Suppressing Broadcast Traffic," 2009, IEEE, New York, New York.

Li et al., "Quorum Based RP Selection Scheme for Mobile WSN Realtime Multicast," 2009, IEEE, New York, New York.

Sampath et al., "'Ethernet on AIR': Scalable Routing in Very Large Ethernet-based Networks," 2010, IEEE, New York, New York.

* cited by examiner

ETHERNET MULTICAST METHOD AND DEVICE

CROSS-REFERENCE TO RELATED APPLICATIONS

This application is a continuation of International Patent Application No. PCT/CN2011/073719, filed on May 6, 2011, which claims priority to Chinese Patent Application No. 201010226149.3, filed on Jul. 14, 2010, both of which are hereby incorporated by reference in their entireties.

FIELD OF THE INVENTION

The present invention relates generally to the communications technology field, and in particular to an Ethernet multicast method and device.

BACKGROUND OF THE INVENTION

With the vigorous development of the Ethernet technology, the performances of Ethernet switches are being constantly improved. Since the Ethernet switches are low-priced and maintained and configured at low cost, a lot of large-scaled networks such as Data Centers and Metropolitan Area Networks (MANs) adopt a large amount of Ethernet switches to perform networking. In the network constructed by the Ethernet switches, the distribution of data in a multicasting manner is advantageous of network construction at low cost, high data distribution efficiency, and the like. However, since the scale of traditional Ethernet networks is restricted due to their poor expandability, the advantage of multicasting in the Ethernet networks cannot be exhibited.

In order to solve the expandability problem of the traditional Ethernet networks and better perform data distribution in a multicasting manner in the Ethernet networks, the conventional art provides a network architecture called SEATTLE, which is capable of both possessing the IP expandability and maintaining the simplicity of the Ethernet networks. SEATTLE uses a DHT (Distributed Hash Table) routing addressing mechanism to realize the expansion of the Ethernet networks. The specific implementation process is described below: on one hand, when the location of a host is being parsed, the host uses a Directory Service to release and maintain a mapping relationship between a MAC address and the current location, and forwards data through this mapping relationship. For example, when a host "_a_" whose MAC address is "_MACa_" arrives at its access switch "_Sa_" this switch must release in the Directory Service a mapping relationship between the MAC of the host a and the location thereof. The switch Sa instructs a switch "_ra_" to store (MACa, Sa) by operating F(MACa)=ra. Meanwhile, the switch Sa serves as a location parser of the host a. Then, when a host "_b_" is connected to a switch Sb and intends to send data to MACa, the host b forwards the data to an access switch Sb, the access switch Sb obtains information of the switch ra by calculating F(MACa)=ra and then forwards the data to the switch ra. Since there may be several hops from the access switch Sb to the switch ra, the switch Sb packages data packets with an address of ra as a header of a destination. After receiving the data packets, the switch ra queries about the access switch of the host a being Sa, and then forwards data to Sa. In order to limit the number of data packets passing through the parser, the switch ra also notifies the switch Sb that the current location of the host a is Sa. The switch Sb then stores in a buffer related information that the current location of the host a is Sa. When the data packets are forwarded subsequently, the switch Sb can forward the data packets by searching for the information in the buffer, thereby improving the data forwarding efficiency.

On the other hand, a host searches for a MAC address corresponding to an IP address by means of ARP in the traditional Ethernet networks, but SEATTLE avoids ARP flooding in the traditional Ethernet networks and expands the ARP, so that the ARP returns both the MAC address of the host and information of the switch connected to the host (the information reflects the location of the host). Since the location information of the host is sensed, the data packets can forward ARP requests by selecting the shortest path.

However, when performing multicast in Ethernet networks with the SEATTLE architecture, the inventors select a multicast root node, randomly map a multicast group to a switch using a hash function, and enable the switch to act as the multicast root node, but this manner of constructing a multicast tree does not take a network topology into consideration, as a result of which the selected multicast tree root node may be far from all the receiving hosts, thereby reducing the Ethernet multicast performance.

SUMMARY OF THE INVENTION

The embodiments of the present invention provide an Ethernet multicast method and device, which improve the capability of distributing multicast data in the Ethernet network.

In order to achieve the above objective, the embodiments of the present invention adopt the following technical solutions:

An Ethernet multicast method, comprising:

receiving a request from a host/multicast source, the request carrying a multicast Media Access Control MAC address of a destination multicast group;

selecting, according to the request, a switch satisfying a particular optimization conditions as a multicast root node corresponding to the multicast MAC address of the destination multicast group when it is determined that the multicast MAC address of the destination multicast group does not have the corresponding multicast root node; and transmitting an identification of the multicast root node to the host/multicast source.

An Ethernet multicast method, comprising:

determining a multicast management device in accordance with a multicast MAC address of a destination multicast group;

transmitting, to the multicast management device, a request carrying the multicast MAC address of the destination multicast group; and receiving an identification of a multicast root node corresponding to the multicast MAC address of the destination multicast group transmitted by the multicast management device.

A multicast management device, comprising:

a first reception unit for receiving a request from a host/multicast source, the request carrying a multicast MAC address of a destination multicast group;

a primary selection unit for selecting, according to the request, a switch satisfying a particular optimization condition as a multicast root node corresponding to the multicast MAC address of the destination multicast group when it is determined that the multicast MAC address of the destination multicast group does not have the corresponding multicast root node; and a first transmission unit for transmitting an identification of the multicast root node to the host/multicast source.

A communication device, comprising:

a determining unit for determining a multicast management device in accordance with a multicast MAC address of a destination multicast group;

a transmission unit for transmitting, to the multicast management device, a request carrying the multicast MAC address of the destination multicast group; and a reception unit for receiving an identification of a multicast root node corresponding to the multicast MAC address of the destination multicast group transmitted by the multicast management device.

In the embodiments of the present invention described with the above-mentioned technical solutions, when a certain host/multicast source intends to join a destination multicast group, first, a multicast management device is determined in accordance with a multicast MAC address of the destination multicast group, a request carrying the multicast MAC address of the destination multicast group is transmitted to the multicast management device, the multicast management device selects, according to the request, a switch satisfying a particular optimization condition as a multicast root node corresponding to the multicast MAC address of the destination multicast group when it is determined that the multicast MAC address of the destination multicast group does not have the corresponding multicast root node. When the multicast root node is selected, an identification of the multicast root node is transmitted to the host/multicast source.

In the embodiments of the present invention, when selecting the multicast root node, the multicast management device selects the switch satisfying a particular optimization condition such as a switch with a closest/closer distance to the host/multicast source, as the multicast root node. Compared with the conventional art that randomly obtains the location of the multicast root node using the hash function, the embodiments of the present invention can reduce the circumstances under which the selected multicast root node is far from all the receiving hosts, thereby improving the capability of multicast data transmission in the Ethernet networks.

BRIEF DESCRIPTION OF THE ACCOMPANYING DRAWINGS

In order to set forth the technical solutions in the embodiments of the present invention or in the conventional art more clearly, the drawings needing to be used in the description of the embodiments or conventional art are briefly introduced below. Apparently, the drawings to be described below are merely some embodiments of the present invention, and those skilled in the art can obtain other drawings according to the following drawings, without paying creative efforts.

DETAILED DESCRIPTION OF THE PREFERRED EMBODIMENTS

A clear and complete description of the technical solutions in the embodiments of the present invention is given below with reference to the drawings in the embodiments of the present invention, and obviously, the embodiments described below are part, instead of the whole, of the embodiments of the present invention. Based on the embodiments in the present invention, all the other embodiments obtained by those skilled in the art, without paying creative efforts, fall within the protection scope of the present invention.

Embodiment 1

The embodiment of the present invention is applied in a scenario in which a layered network topology is supposed to be used, wherein all multicast management devices in the same Ethernet network logically constitute a DHT loop and they jointly manage multicast groups within the entire Ethernet. Each multicast management device under the loop manages a group of switches, and these switches and multicast management devices can be either directly connected through links, or interconnected through other devices such as switches. Of course, the practical application scenario is not limited to the layered network.

The embodiment of the present invention provides an Ethernet multicast method, comprising the following steps:

1001. receiving a request from a host/multicast source, the request carrying a multicast MAC address of a destination multicast group;

1002. selecting, according to the request, a switch satisfying a particular optimization condition as a multicast root node corresponding to the multicast MAC address of the destination multicast group when it is determined that the multicast MAC address of the destination multicast group does not have the corresponding multicast root node;

1003. transmitting an identification of the multicast root node to the host/multicast source.

It needs to be noted that, if a request from the host is received in step 1001, the identification of the multicast root node will be transmitted to the host in step 1003, while if a request from the multicast source is received in step 1001, the identification of the multicast root node will be transmitted to the multicast source in step 1003.

The embodiment of the present invention further provides another Ethernet multicast method, comprising the following steps:

2001. determining a multicast management device in accordance with a multicast MAC address of a destination multicast group;

2002. transmitting, to the multicast management device, a request carrying the multicast MAC address of the destination multicast group; and

2003. receiving an identification of a multicast root node corresponding to the multicast MAC address of the destination multicast group transmitted by the multicast management device.

If the host receives the identification of the multicast root node transmitted by the multicast management device, the host may transmit a join message to the multicast root node, the join message is forwarded to the multicast root node in accordance with a protocol of the shortest path, and all switches on the shortest forwarding path that have received the join message will automatically generate, in their forwarding tables, a table entry containing the multicast group and the multicast root node, thereby constructing a multicast tree branch from the host to the multicast root node.

If the multicast source receives the identification of the multicast root node transmitted by the multicast management device, the multicast source may transmit a multicast data stream to the multicast root node in accordance with the shortest forwarding path, thereby determining the construction of a multicast tree branch from the multicast source to the multicast root node in accordance with the shortest forwarding path.

In the embodiment of the present invention, when selecting the multicast root node, the multicast management device selects the switch satisfying a particular optimization condition such as a switch with a closest/closer distance to the host/multicast source, as the multicast root node. Compared with the conventional art that randomly obtains the location of the multicast root node using the hash function, the embodiments of the present invention can reduce the circumstances under which the selected multicast root node is far from all the receiving hosts, thereby improving the capability of multicast data transmission in the Ethernet networks.

Furthermore, the selection and management of the multicast root node are performed by the multicast management device, so that the multicast management function and the multicast root node are independent of each other within the Ethernet, thereby improving the flexibility and facileness of multicast management.

Figure 1:
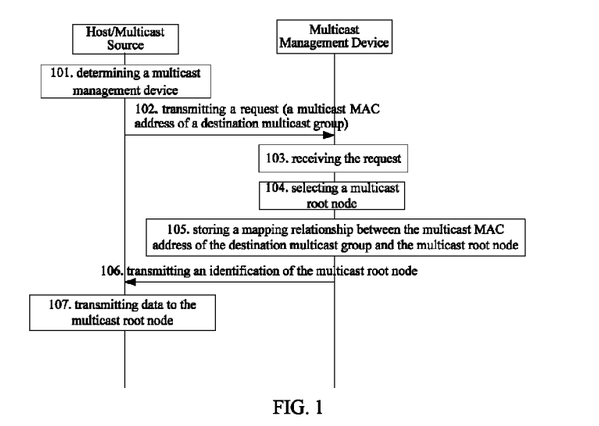
FIG. 1 is a flowchart of an Ethernet multicast method in Embodiment 1.

Further, in order to set forth the implementation process of the Ethernet multicast method provided by the embodiment of the present invention more clearly, the embodiment as shown in FIG. 1 specifically describes an Ethernet multicast method, comprising the steps of:

101. determining a multicast management device in accordance with a multicast MAC address of a destination multicast group on a host/multicast source side.

During the specific application process, a request can be transmitted in this step, through the host/multicast source, to a Direction Switch DS connected directly thereto, and the DS performs a hashing operation to find the corresponding multicast management device. Alternatively, the host/multicast source itself performs a hashing operation to find the corresponding multicast management device.

102. transmitting, to the multicast management device, a request carrying the multicast MAC address of the destination multicast group.

The request may be either a request for joining a multicast group, or a request for obtaining an identification of a multicast root node corresponding to the destination multicast group. The identification may be an IP address or a MAC address of the multicast root node, or a character identifying the multicast root node such as an ID of the multicast root node.

103. receiving a request from the host/multicast source on the multicast management device side, the request carrying the multicast MAC address of the destination multicast group.

104. The multicast management device selects, according to the request, a switch satisfying a particular optimization condition as the multicast root node corresponding to the destination multicast group by means of an optimization algorithm, when it is determined that the multicast MAC address of the destination multicast group does not have the corresponding multicast root node. For example, it is possible to select, among the switches managed by the multicast management device, a switch with the lowest load, or to select, with reference to a geographical location of the host/multicast source, a host closest to the (or all) host(s)/multicast source(s) as a root node of the destination multicast group.

105. The multicast management device stores a mapping relationship between the multicast MAC address of the destination multicast group and the selected multicast root node. For example, the mapping relationship is stored in a mapping table, and when other hosts/multicast sources also make a request for joining the multicast group, a query about the multicast root node corresponding to the multicast MAC address of the destination multicast group is made in the mapping relationship table in accordance with the request received in step 103, an identification of the multicast root node queried about is transmitted to the host/multicast source. Thus, by making the query in the mapping table, the multicast root node corresponding to the multicast MAC address of the multicast group can be directly returned to the corresponding host/multicast source, without the necessity of performing reselection of a multicast root node, thereby improving the efficiency of managing the multicast root node.

106. The multicast management device transmits the identification of the multicast root node corresponding to the multicast MAC address of the destination multicast group to the host/multicast source.

107. The host/multicast source may transmit the corresponding data to the multicast root node after receiving the identification of the multicast root node.

It needs to be noted that, if step 101 is described from the host side, data communication in steps 102 to 107 will be performed between the multicast management device and the host. Likewise, if step 101 is described from the multicast source side, data communication in steps 102 to 107 will be performed between the multicast management device and the multicast source.

In the embodiments of the present invention, an independent multicast management device selects the switch satisfying a particular optimization condition such as a switch with a closest/closer distance to the host, as the multicast root node, so that it is possible to decrease the multicast capability reduction due to the selected multicast root node with a farther distance to the location of the host in the conventional art, thereby improving the multicast capability.

In order to set forth the selection process of the multicast root node in the aforementioned Ethernet multicast method more clearly, a detailed description is given below from the host side and from the multicast source side, respectively.

Figure 2:
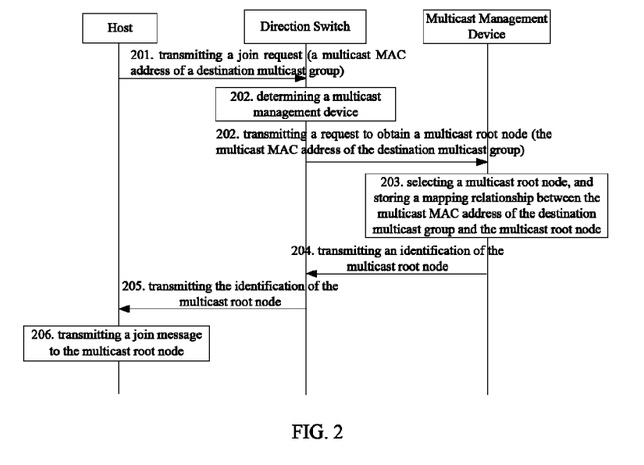
FIG. 2 is a flowchart of the Ethernet multicast method in Embodiment 1 on the host side.

First, a technical solution of realizing the selection of the multicast root node from the host side is described, which as shown in FIG. 2, comprises the following steps:

201. A host a finds a direction switch Sa connected directly thereto through a host discovery protocol, the host a transmits a request for joining a destination multicast group G to the direction switch Sa connected directly thereto, the request carrying a multicast MAC address of the destination multicast group.

202. The direction switch Sa, after receiving the request of the host a to join the destination multicast group G transmitted by the host a, determines a multicast management device in accordance with a multicast MAC address of the destination multicast group. Specifically, the multicast MAC address of the destination multicast group is used as an argument, and an identification of the multicast management device is obtained by calculation using a preset hash function. For example, F1 (MulticastMACAddress)=ManagementUnitID, wherein F1 represents the preset hash function, MulticastMACAddress represents the multicast MAC address of the destination multicast group, and ManagementUnitID is the identification of the multicast management device ra obtained by calculation, and specifically, it may be an IP address, a MAC address or an identifying character such as an ID character, and a message requesting for obtaining an address of the multicast root node RP is transmitted to the multicast management device ra.

203. The multicast management device ra selects, according to the request, a switch satisfying a particular optimization condition as a multicast root node corresponding to the multicast MAC address of the destination multicast group when it is determined that the multicast MAC address of the destination multicast group does not have the corresponding multicast root node.

During specific implementation, the multicast management device ra may select a switch satisfying a particular optimization condition among the switches under its management by means of a root node selection algorithm, with reference to topology information of the network and a geographical location of the host. For example, it selects a switch with the lowest load to serve as a root node of the destination multicast group G, or selects a switch with the closest distance to the host, and stores a mapping relationship between the multicast MAC address of the destination multicast group and the selected multicast root node, and for instance, the mapping relationship may be stored as (MulticastMACAddress, RP), wherein MulticastMACAddress represents the multicast MAC address of the destination multicast group G, and RP represents an identification of the selected multicast root node, which may be an IP address, a MAC address or an identifying character such as an ID.

204. The multicast management device ra forwards the identification of the selected multicast root node to the direction switch Sa.

205. The direction switch Sa transmits the identification of the multicast root node to the host a, but during specific implementation, this step may also be absent in this solution.

206. The direction switch Sa, after receiving the identification of the multicast root node, transmits a join message toward a multicast root node RP direction corresponding to the multicast group G hop by hop, the path through which the message is transmitted follows a shortest path preference algorithm, thereby constructing a branch of a multicast forwarding tree SPT (Shortest Path Tree); all switches on the SPT generate a table entry containing the destination multicast group and the multicast root node, which may be represented as (RP, MulticastMACAddress, ports), wherein ports represent forwarding ports of the switch. The above-mentioned generated SPT takes the multicast root node RP as root, and the direction switch DS as leaf.

At the aforementioned step 201, the host transmits the request for joining the destination multicast group, and meanwhile, the host does not sense information of the multicast root node, which is however obtained by the direction switch Sa, and makes the request for joining the destination multicast group to the multicast root node, and constructs the multicast tree, etc. During specific implementation, optionally, an alternative solution is as follows:

In step 201, the host first does not transmit the request for joining the destination multicast group, but transmits, through the direction switch, the request for obtaining the multicast root node corresponding to the destination multicast group;

In step 202, the direction switch forwards the request for obtaining the multicast root node;

Then, in step 205, the direction switch transmits the multicast root node to the host;

In step 206, the host, after receiving the identification of the multicast root node, transmits to the direction switch Sa the request for joining the destination multicast group, such as a message similar to IGMP join, and the direction switch Sa transmits to the multicast root node the request for joining the destination multicast group. Meanwhile, the host may carry the identification of the multicast root node in the request for joining the destination multicast group transmitted to the direction switch Sa, or may not carry the identification of the multicast root node. If information of the multicast root node is not carried in the join request, the information of the multicast root node needs to be stored through the direction switch Sa in step 5.

In the process of requesting for obtaining the multicast root node on the host side described above, the direction switch determines the multicast management device by performing a hashing operation, and during practical application, the second feasible solution is as follows: the host itself determines the multicast management device by performing a hashing operation, an identification of the multicast management device is carried in the request transmitted to the direction switch, and the direction switch forwards the request from the host to the multicast management device.

Figure 3:
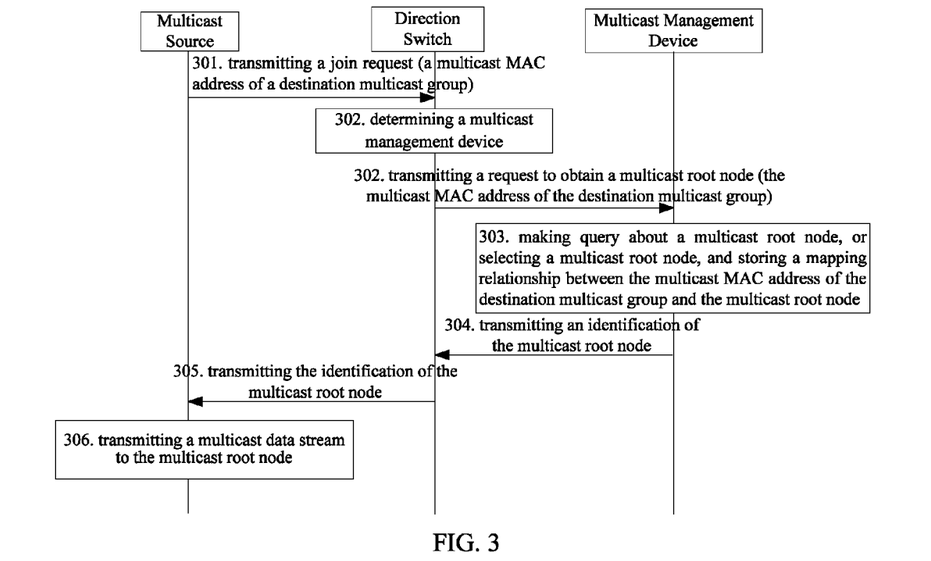
FIG. 3 is a flowchart of the Ethernet multicast method in Embodiment 1 on the multicast source side.

The description on the host side is given above, and the description on the multicast source side is given below, which as shown in FIG. 3 comprises the following steps:

301. The multicast source finds a direction switch connected directly thereto through a host discovery protocol, the multicast source transmits a request for joining a destination multicast group G to the direction switch, the request carrying a multicast MAC address of the destination multicast group G.

302. The direction switch Sa, after receiving the request for joining the destination multicast group G transmitted by the multicast source, determines a multicast management device in accordance with a multicast MAC address of the destination multicast group.

Specifically, the multicast MAC address of the destination multicast group is used as an argument, and an identification of the multicast management device is obtained by calculation using a preset hash function, that is, the multicast management device is found by a hashing operation (the hashing operation obtains the identification of the multicast management device by hashing the multicast MAC address, and the identification may be an IP address or a MAC address or an identifying character such as an ID), and a message requesting for obtaining an address of the multicast root node RP is transmitted to the multicast management device.

303. The multicast management device selects, according to the request, a switch satisfying a particular optimization condition as a multicast root node corresponding to the multicast MAC address of the destination multicast group when it is determined that the multicast MAC address of the destination multicast group does not have the corresponding multicast root node.

During specific implementation, the multicast management device may query about the multicast root node corresponding to the multicast MAC address of the destination multicast group in the mapping relationship table according to the request, and if the multicast root node corresponding to the multicast MAC address of the destination multicast group has been stored in the mapping relationship table, it is only necessary to transmit an identification of the queried multicast root node to the multicast source.

If the mapping relationship table does not have a record of the multicast root node corresponding to the multicast MAC address of the destination multicast group, the multicast management device meanwhile selects a switch by means of an algorithm. For example, it selects a switch with the lowest load to serve as a root node of the destination multicast group G, or selects a switch with the closest distance to the multicast source, and stores a mapping relationship between the multicast MAC address of the destination multicast group and the selected multicast root node, and for instance, the mapping relationship may be stored as (MulticastMACAddress, RP), wherein MulticastMACAddress represents the multicast MAC address of the destination multicast group G, and RP represents the selected multicast root node.

304. The multicast management device forwards an identification of the selected multicast root node to the direction switch.

305. The direction switch transmits the identification of the multicast root node to the multicast source.

306. The multicast source, after receiving the identification of the multicast root node, transmits a multicast data stream to the direction switch, the direction switch selects a shortest path to the multicast root node RP, and forwards the data stream from the multicast source by unicast, thereby completing construction of a distribution tree from the multicast source to the multicast root node.

In the process of requesting for obtaining the multicast root node on the multicast source side described above, the direction switch determines the multicast management device by performing a hashing operation, and during practical application, alternatively, the multicast source itself determines the multicast management device by performing a hashing operation, an identification of the multicast management device is carried in the request transmitted to the direction switch, and then the direction switch forwards the request from the multicast source to the multicast management device.

In the embodiment of the present invention, when selecting the multicast root node, the multicast management device selects a switch satisfying a particular optimization condition such as a switch with a closer distance to the host/multicast source, as the multicast root node, with reference to topology information of the network and a geographical location of the host/multicast source. Compared with the conventional art that randomly obtains the identification of the multicast root node using the hash function, the embodiment of the present invention can reduce the circumstances under which the selected multicast root node is far from all the receiving hosts, thereby improving the capability of multicast data transmission in the Ethernet networks.

Embodiment 2

In order to perform better management of a multicast group within the Ethernet, the embodiment of the present invention further provides an optimized technical solution, that is, at a different time, in the embodiment of the present invention, the multicast management device may trigger reselection of a multicast root node and adjust the existing multicast tree, so that it is possible to construct a multicast distribution tree more reasonably, thereby further improving the capability of multicast data distribution within the Ethernet. A detailed description of reselection of the multicast root node is given below.

Figure 4:
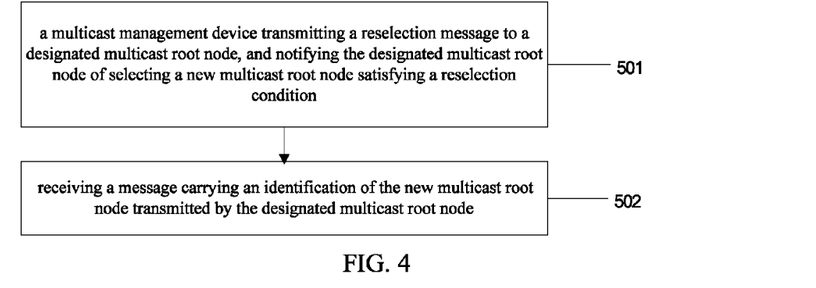
FIG. 4 is a flowchart of an Ethernet multicast method in Embodiment 2.

As shown in FIG. 4, there is provided an Ethernet multicast method, comprising the following steps:

501. A multicast management device transmits a reselection message to a designated multicast root node, and notifies the designated multicast root node of selecting a new multicast root node satisfying a reselection condition. During specific application, the multicast management device can periodically trigger an old multicast root node to perform reselection of a root node; alternatively, the multicast management device may trigger the old multicast root node to reselect a new multicast root node according to a certain algorithm decision, by detecting information such as a certain change in joining all hosts within the multicast group, and topology, this selection algorithm can ensure the constructed multicast distribution tree to be superior/secondly superior, for example, the new multicast root node selected using an optimization algorithm enables the traffic within the entire network to be superior; as an alternative, the average number of hops from the new multicast root node to each host within the multicast group is smallest; as a further alternative, the multicast tree branch constructed by the new multicast root node is constructed of the shortest path. The newly selected root node can be either defined or not defined in a set of switches managed by the original multicast management device.

When the designated multicast root node has reselected the new multicast root node, an identification of the new multicast root node is transmitted to the multicast management device.

502. The multicast management device receives the identification of the new multicast root node transmitted by the designated multicast root node.

In practical application, another feasible solution is that the multicast management device itself triggers reselection of the multicast root node, and the multicast management device itself selects the new multicast root node satisfying the reselection condition.

There may be many factors that trigger the reselection of the multicast root node, for example, the reselection of a root node is triggered based on configuration information, changes in network conditions are detected, reselection of the root node is triggered based on the optimization algorithm, etc. The specific triggering factors are not only limited to those mentioned above.

Figure 5:
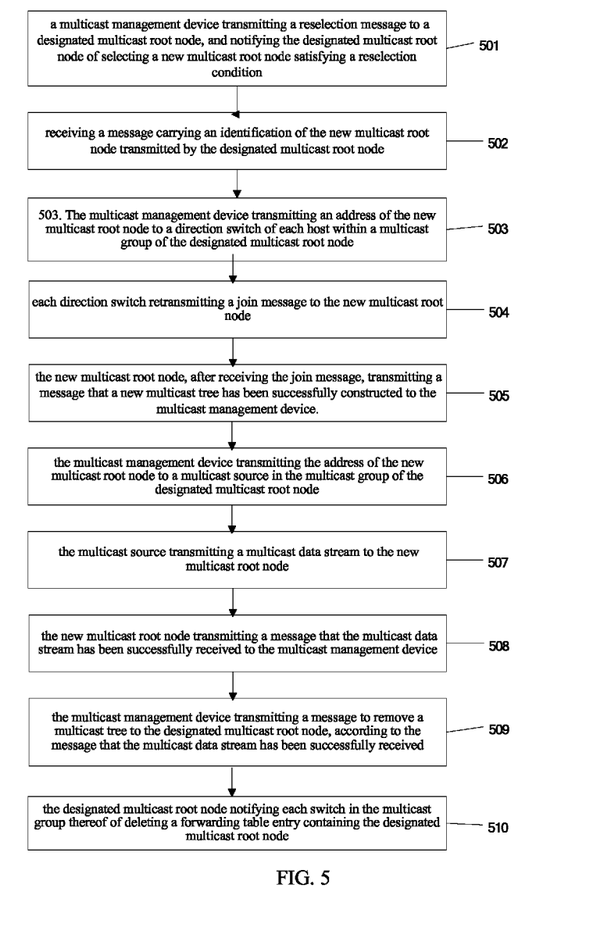
FIG. 5 is a flowchart of the Ethernet multicast method in Embodiment 2.

As shown in FIG. 5, the multicast management device, after obtaining the identification of the new multicast root node, performs construction of a new multicast tree and removal of an old multicast tree, and further, the method further comprises the following steps:

503. The multicast management device transmits the identification of the new multicast root node to a direction switch of each host within the multicast group of the designated multicast root node;

504. Each direction switch, after receiving information of the new multicast root node, retransmits a join message to the new multicast root node, thereby constructing the new multicast tree, and all switches in the new multicast tree generate a table entry (RP, MulticastMACAddress, Ports) in their forwarding tables.

505. The new multicast root node, after receiving the join message, transmits a message that a new multicast tree has been successfully constructed to the multicast management device.

506. The multicast management device, after receiving the message transmitted by the new multicast root node that the new multicast tree has been successfully constructed, transmits an identification of the new multicast root node to a multicast source in the multicast group of the designated multicast root node, and notifies the multicast source that the multicast root node has been changed;

507. The multicast source transmits a multicast data stream to the new multicast root node according to the notification from the multicast management device;

508. The new multicast root node, after receiving the multicast data stream, transmits a message that the multicast data stream has been successfully received to the multicast management device;

509. The multicast management device transmits a message to remove the multicast tree to the designated multicast root node, according to the message that the multicast data stream has been successfully received;

510. The designated multicast root node notifies each switch in its multicast group of deleting a forwarding table entry containing the designated multicast root node, thereby completing removal of the old multicast tree.

In the step 504, an alternative substitute solution is as follows: the direction switch transmits the request to the host, and the host after receiving the request initiates a request to the direction switch and the direction switch transmits the join message to the new multicast root node RP, thereby constructing the new multicast tree.

In the multicast method provided by the embodiment of the present invention, it is possible to perform readjustment of the old multicast tree and select the more optimized new multicast root node. For example, the new multicast root node enables the traffic within the entire network to be most optimum, or the new multicast root node has a closest average location to all hosts within the belonging group. Then a new multicast tree including the new multicast root node is constructed, and for example, the root node of the new multicast tree has the closest average location to all hosts within the belonging group, so that the capability of multicast data distribution within the Ethernet can be further improved.

Moreover, there is a further multicast method in the conventional art, that is, in a layered network including Ethernet switches, a multicast group is hashed to a specific CoreSwitch using a hash function, the CoreSwitch serves as a multicast root node, and data packets are transmitted to the CoreSwitch and distributed. However, this method fixedly selects the CoreSwitch in a tree-like topology structure as the multicast root node, which tends to cause the multicast root node far from all receiving hosts. In contrast, the embodiment of the present invention can perform selection and adjustment of the multicast root node with reference to network topology information and a geographical location of the host, which can optimize the capability of transmission between the multicast root node and all the receiving hosts, thereby improving the multicast performance.

Embodiment 3

Figure 6:
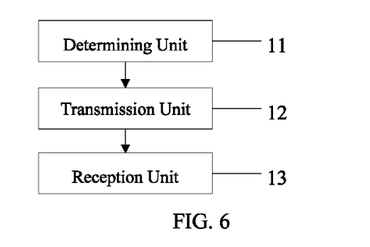
FIG. 6 is a structural view of a communication device in Embodiment 3.

The invention of the present invention provides a communication device, which as shown in FIG. 6 comprises: a determining unit 11, a transmission unit 12 and a reception unit 13.

When the communication device intends to join a destination multicast group, the determining unit 11 is used to determine a multicast management device in accordance with a multicast MAC address of the destination multicast group; the transmission unit 12 is used to transmit, to the multicast management device, a request carrying the multicast MAC address of the destination multicast group. The multicast management device returns an identification of a corresponding multicast root node in accordance with the multicast MAC address of the destination multicast group, and the identification may specifically be an IP address, a MAC address or other identifying character such as an ID of the multicast root node.

The reception unit 13 is used to receive the identification of the multicast root node corresponding to the multicast MAC address of the destination multicast group transmitted by the multicast management device.

Further, the determining unit 11 obtains the identification of the multicast management device by calculation using a preset hash function, by using the multicast MAC address of the destination multicast group as an argument, and determines the multicast management device in accordance with the identification of the multicast management device. In practical application, the functional entity employed by the communication device may be either a host or combination of the host and its direction switch. For example, the host obtains the identification of the multicast management device by calculation using a preset hash function, by using the multicast MAC address of the destination multicast group as an argument. Taking another example, the host transmits a request for joining the destination multicast group, its direction switch determines the identification of the multicast management device by a hashing operation in accordance with the request, and then the direction switch transmits a request for obtaining the multicast root node to the multicast management device.

The functional entity used by the communication device may be either a multicast source or combination of the multicast source and its direction switch.

Figure 7:
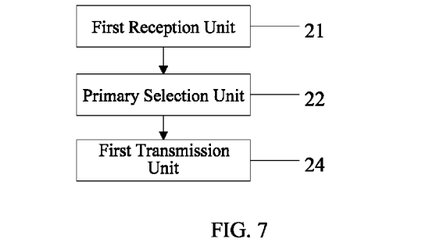
FIG. 7 is a first structural view of a multicast management device in Embodiment 3.

Correspondingly, the embodiment of the present invention provides a multicast management device, and as shown in FIG. 7, the device comprises a first reception unit 21, a primary selection unit 22 and a first transmission unit 24.

The first reception unit 21 is used to receive a request from a host/multicast source, wherein the request carries a multicast MAC address of a destination multicast group; the primary selection unit 22 is used to select, according to the request, a destination switch that satisfies particular optimization conditions as a multicast root node corresponding to the destination multicast group when it is determined that the multicast MAC address of the destination multicast group does not have the corresponding multicast root node; the first transmission unit 24 is used to transmit an identification of the multicast root node to the host/the multicast source.

Figure 8:
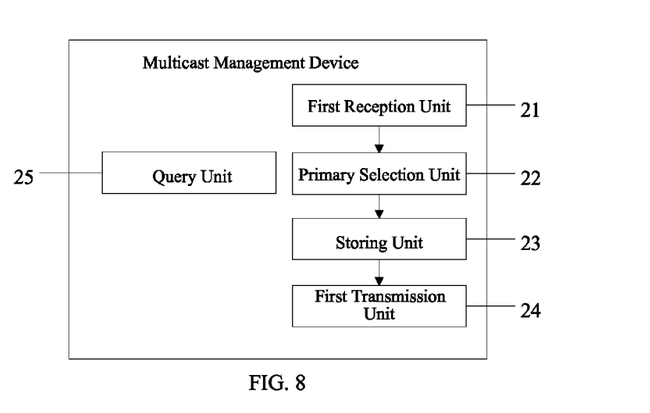
FIG. 8 is a second structural view of the multicast management device in Embodiment 3.

It needs to be noted that, when a first host or multicast source joins the destination multicast group, the primary selection unit selects the multicast root node, and as shown in FIG. 8, the multicast management device further comprises: a storing unit 23 and a query unit 25. The storing unit 23 stores, in a mapping table, a mapping relationship between the multicast MAC address of the destination multicast group and the multicast root node selected by the primary selection unit. When other host or multicast source makes a request for joining the destination multicast group, the query unit 25 is used to make a query, in the mapping relationship table, about the multicast root node corresponding to the multicast MAC address of the destination multicast group in accordance with the request received by the first reception unit 21. The first transmission unit 24 is further used to transmit an identification of the queried multicast root node to the host/multicast source.

Figure 9:
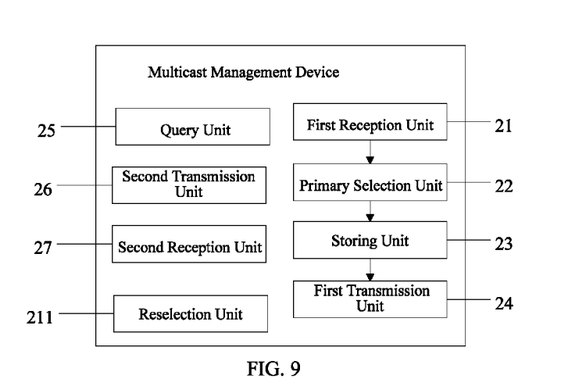
FIG. 9 is a third structural view of the multicast management device in Embodiment 3.

Further, in order to optimize a multicast tree, the multicast management device may trigger selection of the multicast root node within a preset period, and as shown in FIG. 9, the multicast management device further comprises: a second transmission unit 26 and a second reception unit 27.

The second transmission unit 26 is used to transmit a reselection message to a designated multicast root node, and notifies the designated multicast root node of selecting a new multicast root node satisfying a reselection condition; the second reception unit 27 is used to receive an identification of the new multicast root node transmitted by the designated multicast root node, wherein the identification may be an IP address, a MAC address or an identifying character such as an ID.

Optionally, as shown in FIG. 9, the multicast management device further comprises: a reselection unit 211 that is used to select a new multicast root node satisfying the reselection condition.

Figure 10:
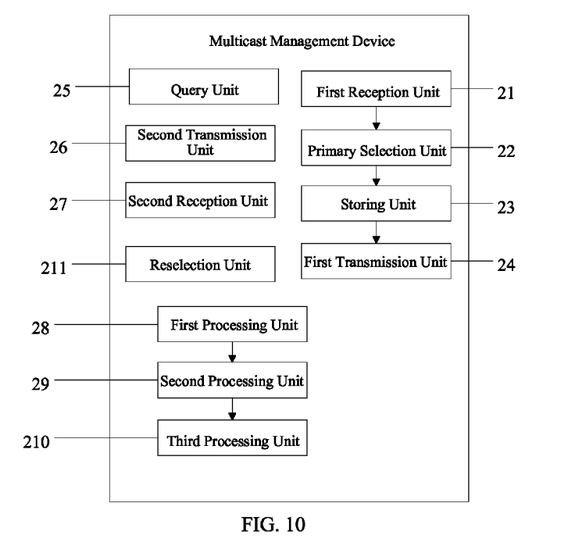
FIG. 10 is a fourth structural view of the multicast management device in Embodiment 3.

Further, in order to construct a new multicast tree consisting of the new multicast root node, as shown in FIG. 10, the multicast management device further comprises: a first processing unit 28, a second processing unit 29 and a third processing unit 210.

The first processing unit 28 is used to transmit an identification of the new multicast root node to each of hosts within the multicast group of the designated multicast root node, instructs each of the hosts to transmit a join message to the new multicast root node, and receives a message, transmitted by the new multicast root node, that the new multicast tree has been successfully constructed;

The second processing unit 29 is used to transmit an identification of the new multicast root node to a multicast source within the multicast group of the designated multicast root node, instructs the multicast source to transmit a multicast data stream to the new multicast root node, and receives a message, transmitted by the new multicast root node, that the multicast data stream has been successfully received;

The third processing unit 210 is used to transmit, to the designated multicast root node, a message to remove the multicast tree, and instructs the designated multicast root node to notify each switch in the multicast group of deleting a forwarding table entry containing the designated multicast root node.

During practical application, the multicast management device may specifically be a network element entity such as a switch, a server, and a router or combination of one or more of them.

The multicast management device provided by the embodiment of the present invention, when selecting the multicast root node, selects a switch satisfying a particular optimization condition as the multicast root node, with reference to topology information of the network and a geographical location of the host or the multicast source, and can perform adjustment of the multicast tree by reselection of the multicast root node. Compared with the conventional art that randomly obtains the identification of the multicast root node using a hash function, the embodiment of the present invention can reduce the circumstances under which the selected multicast root node is far from all the receiving hosts, thereby improving the capability of multicast data transmission in the Ethernet networks.

The embodiment of the present invention mainly applies to a computer network field, and in particular, improves the Ethernet multicast capability when performing multicast data distribution within the Ethernet.

It would be appreciated by those skilled in the art that all or part of flows in the methods of the aforementioned embodiments can be carried out by a computer program instructing relevant hardware, and the program can be stored in a computer readable storage medium, and when being executed, may comprise flows of the methods in the embodiments described above, wherein the storage medium may be a magnetic disc, an optical disc, a Read-Only Memory (ROM), or a Random Access Memory (RAM), or the like.

What is described above is merely the specific modes of carrying out the present invention, but the protection scope of the present invention is not limited to these. Any technical persons familiar with this technical field would readily conceive of alternation or substitution within the technical scope revealed by the present invention, which should be covered within the protection scope of the present invention. Therefore, the protection scope of the present invention should be based on the protection scope of the appended claims.

What is claimed is:

1. An Ethernet multicast method, comprising:
   receiving, by a multicast management device, a request from a host/multicast source, the request carrying a multicast Media Access Control (MAC) address of a destination multicast group;
   determining whether or not the multicast MAC address of the destination multicast group corresponds to a multicast root node, according to the request, when the multicast MAC address of the destination multicast group does not correspond to the multicast root node, then selecting a switch that satisfies a particular optimization condition as the multicast root node corresponding to the multicast MAC address of the destination multicast group; and
   transmitting an identification of the multicast root node to the host/multicast source,
   wherein the particular optimization condition includes that among switches managed by the multicast management device, the switch selected as the multicast root node has a shortest path to the host/multicast source;
   storing, in a mapping relationship table, a mapping relationship between the multicast MAC address of the destination multicast group and the selected multicast root node;
   querying, in the mapping relationship table, about the multicast root node corresponding to the multicast MAC address of the destination multicast group, according to the request;
   transmitting an identification of the multicast root node queried about to the host/multicast source.

2. The Ethernet multicast method according to claim 1, further comprising:
   transmitting a reselection message to a designated multicast root node, and notifying the designated multicast root node of selecting a new multicast root node satisfying a reselection condition; receiving a message carrying an identification of the new multicast root node transmitted by the designated multicast root node.

3. The Ethernet multicast method according to claim 1, further comprising:
   selecting, by the multicast management device, a new multicast root node satisfying a reselection condition.

4. The Ethernet multicast method according to claim 2, wherein the reselection condition includes:
   that the new multicast root node causes the traffic within the entire network to be most optimum.

5. The Ethernet multicast method according to claim 2, further comprising:
  transmitting the identification of the new multicast root node to each of hosts within a multicast group of the designated multicast root node, instructing each of the hosts to transmit a join message to the new multicast root node, and receiving a message, transmitted by the new multicast root node, that a new multicast tree has been successfully constructed;
  transmitting the identification of the new multicast root node to a multicast source within a multicast group of the designated multicast root node, instructing the multicast source to transmit a multicast data stream to the new multicast root node, and receiving a message, transmitted by the new multicast root node, that the multicast data stream has been successfully received;
  transmitting, to the designated multicast root node, a message to remove a multicast tree, instructing the designated multicast root node to notify each switch in the multicast group of deleting a forwarding table entry containing the designated multicast root node.

6. The Ethernet multicast method according to claim 2, wherein the reselection condition includes:
  that the new multicast root node has the smallest average number of hops to each host within a multicast group of the new multicast root node.

7. The Ethernet multicast method according to claim 2, wherein the reselection condition includes:
  that a multicast tree branch constructed of the new multicast root node consists of the shortest path.

8. An Ethernet multicast method, comprising:
  determining a multicast management device in accordance with a multicast Media Access Control (MAC) address of a destination multicast group;
  transmitting, to the multicast management device, a request carrying the multicast MAC address of the destination multicast group sent by a host/multicast source; and
  receiving an identification of a multicast root node corresponding to the multicast MAC address of the destination multicast group transmitted by the multicast management device, the multicast root node is a selected switch that satisfies a particular optimization condition,
  wherein the particular optimization condition includes that among switches managed by the multicast management device, the switch selected as the multicast root node has a shortest path to the host/multicast source;
  wherein determining the multicast management device in accordance with the multicast MAC address of the destination multicast group comprises:
  obtaining the identification of the multicast management device by calculation using a preset hash function, with the multicast MAC address of the destination multicast group as an argument, and determining the multicast management device in accordance with the identification of the multicast management device.

9. A multicast management device, comprising: a processor configured to:
  receive a request from a host/multicast source, the request carrying a multicast Media Access Control (MAC) address of a destination multicast group;
  select, according to the request, a switch that satisfies a particular optimization condition as a multicast root node corresponding to the multicast MAC address of the destination multicast group when it is determined that the multicast MAC address of the destination multicast group does not have the corresponding multicast root node; and
  transmit, an identification of the multicast root node to the host/multicast source,
  wherein the particular optimization condition includes that among switches managed by the multicast management device, the switch selected as the multicast root node has a shortest path to the host/multicast source;
  wherein the processor is further configured to:
  store, in a mapping relationship table, a mapping relationship between the multicast MAC address of the destination multicast group and the selected multicast root node;
  query, in the mapping relationship table, about the multicast root node corresponding to the multicast MAC address of the destination multicast group in accordance with the request;
  transmit an identification of the queried multicast root node to the host/multicast source.

10. The multicast management device according to claim 9, wherein the processor is further configured to:
  transmit a reselection message to a designated multicast root node, and notify the designated multicast root node of selecting a new multicast root node satisfying a reselection condition, and receive a message carrying an identification of the new multicast root node transmitted by the designated multicast root node.

11. The multicast management device according to claim 9, wherein the processor is further configured to:
  select a new multicast root node satisfying a reselection condition.

12. The multicast management device according to claim 10, wherein the processor is further configured to:
  transmit the identification of the new multicast root node to each of hosts within a multicast group of the designated multicast root node, instruct each of the hosts to transmit a join message to the new multicast root node, and receive a first message, transmitted by the new multicast root node, that a new multicast tree has been successfully constructed;
  transmit the identification of the new multicast root node to a multicast source within the multicast group of the designated multicast root node, instruct the multicast source to transmit a multicast data stream to the new multicast root node, and receive a second message, transmitted by the new multicast root node, that the multicast data stream has been successfully received;
  transmit, to the designated multicast root node, a third message to remove a multicast tree, instruct the designated multicast root node to notify each switch in the multicast group of deleting a forwarding table entry containing the designated multicast root node.

13. A communication device, comprising a processor configured to:
  determine a multicast management device in accordance with a multicast Media Access Control (MAC) address of a destination multicast group;
  transmit, to the multicast management device, a request carrying the multicast MAC address of the destination multicast group sent from a host/multicast source; and
  receive an identification of a multicast root node corresponding to the multicast MAC address of the destination multicast group transmitted by the multicast management device, the multicast root node is a selected switch that satisfies a particular optimization condition, wherein the particular optimization condition includes that among switches managed by the multi management device, the switch selected as the multicast root node has a shortest path to the host/multicast source;

wherein the processor is further configured to obtain the identification of the multicast management device by calculation using a preset hash function, with the multicast MAC address of the destination multicast group as an argument, and determine the multicast management device in accordance with the identification of the multicast management device.

* * * * *